No. 892,231. PATENTED JUNE 30, 1908.
C. A. EIDAM.
MACHINE FOR SMOOTHING BOARDS.
APPLICATION FILED NOV. 22, 1907.
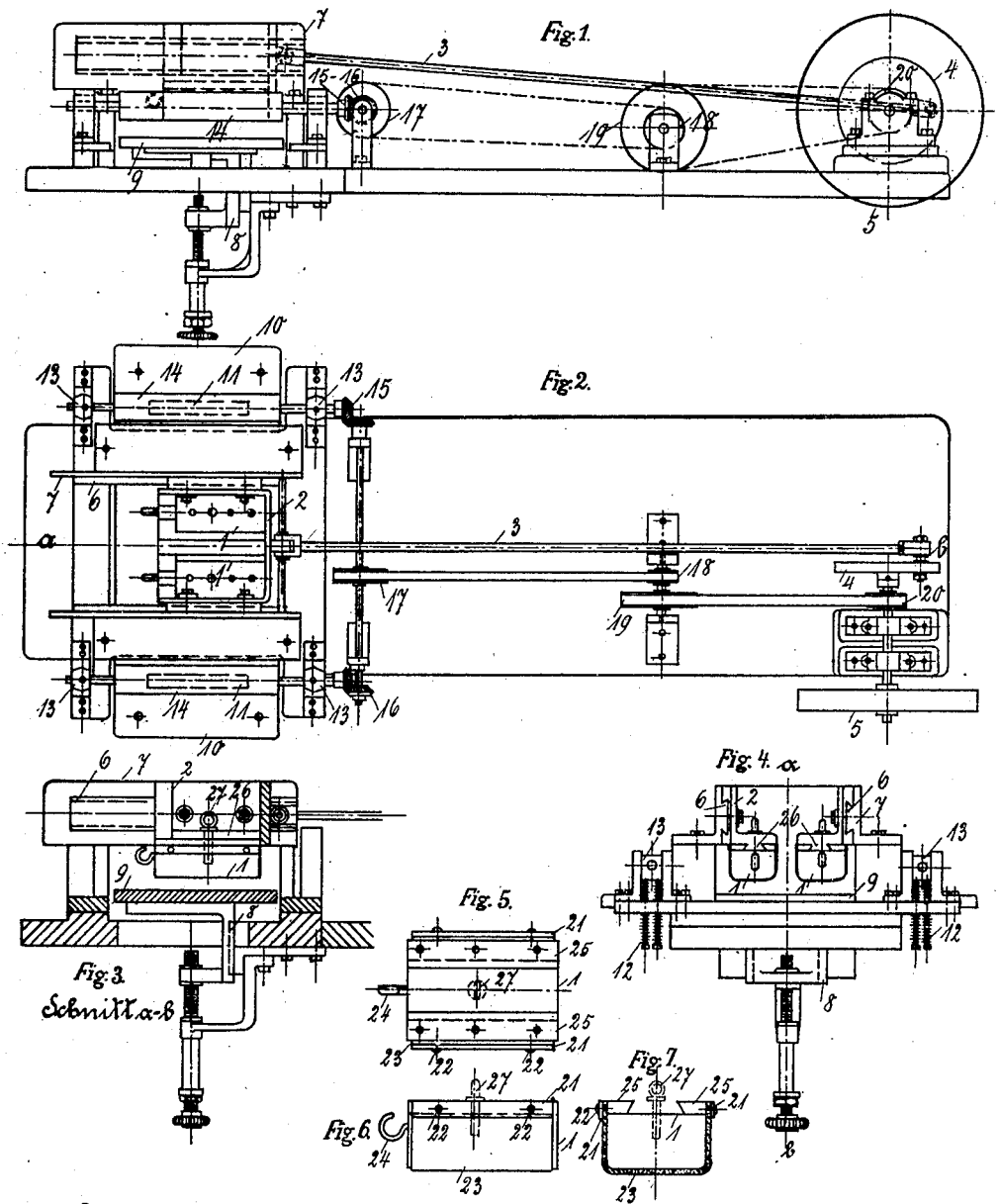

UNITED STATES PATENT OFFICE.

CARL AUGUST EIDAM, OF WILSDRUFF, NEAR DRESDEN, GERMANY.

MACHINE FOR SMOOTHING BOARDS.

No. 892,231.  Specification of Letters Patent.  Patented June 30, 1908.

Application filed November 22, 1907. Serial No. 403,411.

*To all whom it may concern:*

Be it known that I, CARL AUGUST EIDAM, joiner, at Wilsdruff, Saxony, Germany, subject of the King of Saxony, residing at Wilsdruff, near Dresden, Saxony, Germany, have invented certain new and useful Improvements in Machines for Smoothing Boards, of which the following is a specification.

The present invention relates to a machine for smoothing boards which is actuated by manual or other power. With this machine the smoothing is effected by moving a carriage furnished with easily interchangeable polishing blocks to and fro in the transverse direction of the board, while a mechanical feed movement is at the same time imparted to the board independently of the movement of the blocks. This machine for smoothing boards and the like is in fact a machine that is extremely suitable for small trades, as it works quickly and precisely, is cheap and simple and therefore seldom needs repair.

The invention is illustrated in the accompanying drawing Figure 1 being a front elevation, Fig. 2 a plan, Fig. 3 a longitudinal section through the axis *a—b* in Fig. 2, Fig. 4 is a side elevation of Fig. 1 and Figs. 5, 6, and 7 detail views of the polishing block in plan front elevation and side elevation.

The carriage 2 carrying the two polishing blocks 1 is reciprocated on the guide bars 6 of the guide-bed 7 by means of the connecting rod 3 and the crank disk 4 through a pulley 5 or in any other suitable manner for example by means of a fly wheel and a hand-crank. Below the guide-bed 7 is a table 9 which can be vertically adjusted in a suitable guide 8 the table being adjusted by a hand-wheel from below or by means of suitable gear from the side and moved forwards horizontally by means of the two fixed table parts 10. Each of the latter carries a guide-roller 11 which is let into the upper surface of the table. Above the guide rollers conveying rollers 14 are seated on both sides of the carriage in bearings 13 which are adjustable by means of screws 12 under the action of spiral springs. These conveying rollers are covered with india-rubber or the like. They are rotated in the feed direction by pairs of bevel wheels 15, 16 which in turn are rotated from the main driving device by means of various gears through the medium of belt pulleys 17, 18, 19, 20 or in some other suitable manner.

The two actual smoothing blocks are preferably made of wood or the like with side fixing strips 21 and fixing screws 22 and are covered with glass paper 23 which is fixed at 21 and 22. In front each of the blocks has a handle 24 for pushing in and out and two guide pieces 25 by means of which they can be pushed on to suitable guides 26 fixed on the carriage 2. A pin 27 which is inserted from above through a hole in the guides 26 into a corresponding hole in the block 1 secures the block against longitudinal shifting during the working process.

The action of the whole device is as follows:—The board to be smoothed is pushed from one side between the conveying roller and the table as far as the middle of the carriage 2, the table 9 is adjusted according to the thickness of the board and there upon the feed-movement effected automatically to the extent of the smoothing work that is proceeding by stages.

Having now particularly described and ascertained the nature of my said invention and in what manner the same is to be performed, I declare that what I claim is:—

1. A machine for smoothing boards comprising a guide bed having a vertically adjustable middle portion, a carriage reciprocatingly mounted on the guide bed and provided with interchangeable smoothing blocks having guide bars, means for operating the said vertically adjustable middle portion, means for transversely reciprocating the blocks, means for automatically feeding a board under the carriage according to the speed of the latter, and means for actuating the board-feeding means.

2. A machine for smoothing boards comprising a bed having guide bars and a vertically adjustable middle portion, a carriage reciprocatingly mounted on the guide bed and provided with a plurality of smoothing blocks each having a smoothing surface formed of glass paper and separably fixed to the blocks, each block also being provided with two guide bars on its upper surface, a guide fixed on the carriage and engaged by the guide bars of the blocks, means for preventing the blocks from shifting longitudinally, means for reciprocating the blocks in planes at right angles to the direction of feed of the board, and means for automatically feeding a board under the carriage according to the speed of the latter.

3. A machine for smoothing boards comprising a guide bed having a vertically adjustable middle portion, means for operating the said vertically adjustable middle portion, conveying rollers, a guide roller below the conveying rollers and let into the surface of the bed, a carriage mounted on the bed, and transversely reciprocating smoothing blocks held by the carriage.

In testimony whereof I have hereunto set my hand in presence of two subscribing witnesses.

CARL AUGUST EIDAM.

Witnesses:
PAUL ARRAS,
CLÄRE SIMON.